United States Patent [19]

Forrest

[11] 4,098,488

[45] Jul. 4, 1978

[54] NOZZLE LATCH MECHANISM

[75] Inventor: Richard A. Forrest, Muskegon, Mich.

[73] Assignee: Enterprise Brass Works, Muskegon, Mich.

[21] Appl. No.: 646,405

[22] Filed: Jan. 2, 1976

[51] Int. Cl.$^2$ .............................................. F16K 31/44

[52] U.S. Cl. .................................... 251/240; 141/218; 222/509; 74/529; 251/297

[58] Field of Search ......................... 141/218, 220–226; 222/334, 509; 251/93, 98, 101, 102, 104, 110, 105, 89, 90, 74, 103, 66, 237, 239, 240, 241, 297; 74/529

[56] References Cited

U.S. PATENT DOCUMENTS

| | | | |
|---|---|---|---|
| 1,810,547 | 6/1931 | Woods | 251/110 |
| 2,081,464 | 5/1937 | Stewart | 251/110 |
| 2,348,151 | 5/1944 | Rotter et al. | 222/334 |
| 2,837,240 | 6/1958 | Boone | 141/218 |
| 2,867,249 | 1/1959 | Denlinger | 141/218 |
| 3,312,257 | 4/1967 | Knapp et al. | 141/225 |
| 3,521,681 | 7/1970 | Wilson | 141/218 |

*Primary Examiner*—Martin P. Schwadron
*Assistant Examiner*—G. L. Walton
*Attorney, Agent, or Firm*—McGlynn and Milton

[57] ABSTRACT

An automatic dispensing nozzle of the type for dispensing liquid such as gasoline, or the like, into a container and for automatically shutting off when the container is full. The assembly includes a housing having a fluid inlet and an outlet with the fluid passage extending therebetween and a valve disposed in the passage with a valve actuating stem extending exteriorly of the housing. A handle guard including a downwardly extending guide portion and a forwardly extending guard stem. A handle is pivotally supported at a front end adjacent the connection of the handle guard to the housing and extends to a rear end disposed adjacent the guide portion of the handle guard and engages the valve actuating stem for moving the valve actuating stem upon pivotal movement of the handle. The guide portion of the handle guard includes a forwardly extending rib and the rear end of the handle means is bifurcated to define flanges disposed on either side of the rib. A bore extends into the rear end of the handle between the flanges and a spring is disposed in the bottom of the bore and urges a plunger against the front edge of the rib. The rib includes a plurality of recesses in which the plunger may be frictionally held.

3 Claims, 3 Drawing Figures

NOZZLE LATCH MECHANISM

The subject invention relates to an automatic nozzle of the type for dispensing liquid such as gasoline, or the like, into a container and for automatically shutting off when the container becomes full. Such assemblies typically include a housing through which fluid flows as controlled by a valve assembly within the housing. A valve actuating mechanism extends exteriorly of the housing and is engaged by a pivotal handle. A handle guard is connected to the housing and surrounds the handle to prevent inadvertent movement of the handle. Such assemblies normally include a vacuum system that senses when liquid surrounds the end of the outlet tube of the nozzle, thereby automatically closing the valve. Such assemblies frequently include some latching mechanism whereby the handle may be pivoted to move the valve mechanism to open the valve and is, thereafter latched in position so that the nozzle will automatically dispense liquid until the container is full. Such latching mechanisms have been somewhat complex and, therefore, expensive.

In accordance with the instant invention, there is provided an improved nozzle latch assembly for holding the handle in a selected position and which latch assembly is simple in construction, therefore, inexpensive yet reliable. In accordance with the instant invention, a detent means interconnects the rear end of the handle and the handle guard for frictionally holding the handle in selected positions, yet allowing the handle to move to the "off" position against a stop with very little effort.

Figure 1:
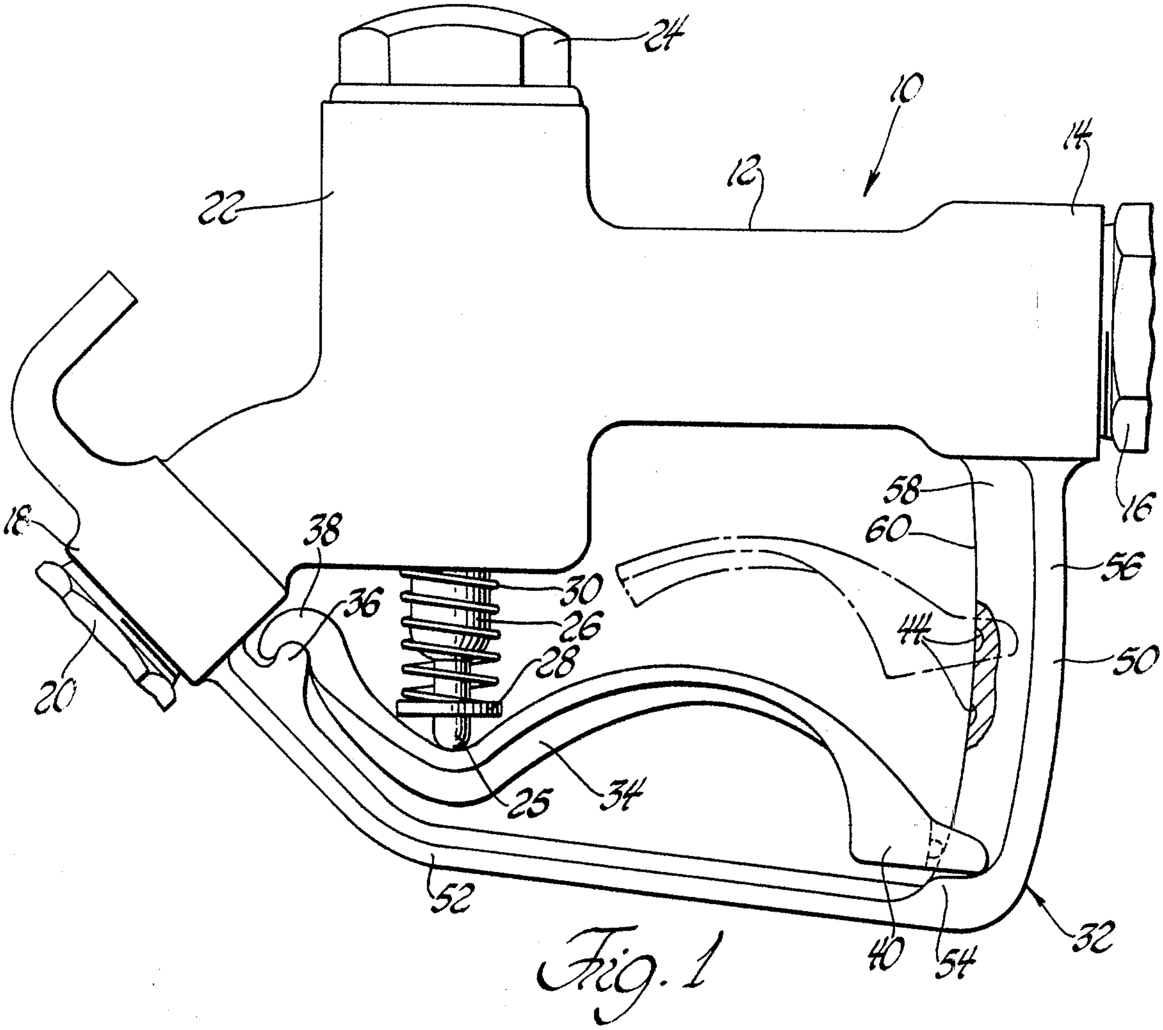
Figure 2:
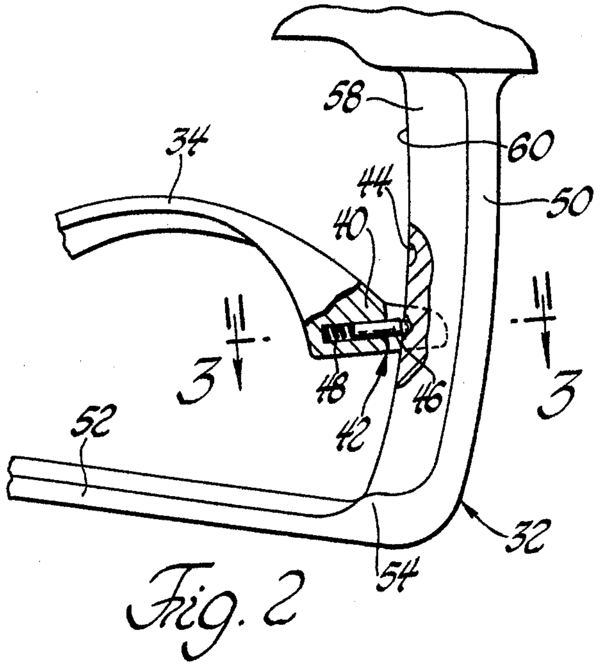
Figure 3:
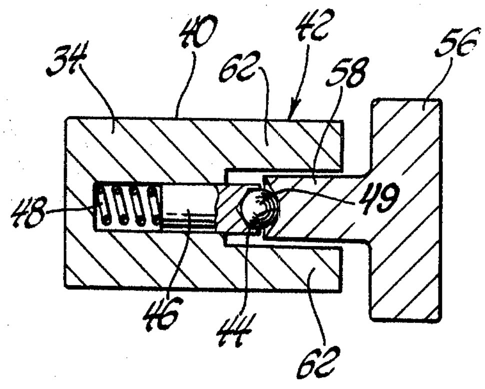

Other advantages of the present invention will be readily appreciated as the same becomes better understood by reference to the following detailed description when considered in connection with the accompanying drawings wherein:

FIG. 1 is a side elevational view of the preferred embodiment of the subject invention showing the handle in the "off" position in full lines and moved to a selected "on" position in phantom; and FIG. 2 is a fragmentary side elevational view partially broken away and in cross section showing the handle moved to a selected "on" position; and FIG. 3 is an enlarged cross-sectional view taken substantially along line 3—3 of FIG. 2.

Referring to the drawings, a nozzle latch assembly constructed in accordance with the instant invention is generally shown at 10. The assembly includes a housing 12 which is preferably a casting having an inlet 14 to which an end fitting 16 of a supply hose may be threadedly engaged and an outlet 18 to which a fitting 20 may be threadedly engaged. As is well known, the fitting 20 supports a nozzle tube which extends to an open end for dispensing a liquid such as gasoline. A fluid passage extends between the inlet 14 and the outlet 18 and a valve means is disposed within the valve portion 22 of the housing. A cap 24 threadedly engages the housing and may be removed for access to the valve means. The valve means controls the flow of fluid between the inlet 14 and the outlet 18 and includes a valve actuating means comprising the valve stem 25 extending exteriorly through an integral stem portion 26 of the housing. The valve stem 25 includes a stop 28 secured thereto and a coil spring 30 reacts between the stop 28 and the housing for biasing the stem 25 out of the housing.

A handle guard means generally indicated at 32 is integrally connected to and extends from the housing 12 adjacent to and surrounding the valve actuating stem 25.

A handle 34 is pivotally supported on an arcuate pivot 36 at its arcuate cup-shaped front end 38 and extends to a rear end 40 which is disposed adjacent the handle guard means 32.

Also included is a detent means generally shown at 42 operatively interconnecting the rear end 40 of the handle 34 and a handle guard means 32 for frictionally holding the handle 34 in a selected position such as that shown in phantom in FIG. 1 and in full lines in FIG. 2.

The detent means 42 includes a plurality of recesses 44, a plunger 46 for engaging the recesses 44 and biasing means comprising the coil spring 48 for urging the plunger 46 into the recesses 44 which allowing the plunger to retract from the recesses 44. A ball 49 is rotatably disposed in a counter bore in the plunger to engage the recesses 44. The plunger 46 and the spring 48 are disposed in a bore which extends into the rear end of the handle 34 with the spring 48 being disposed between the inward end of the plunger 46 and the bottom of the bore and the plunger 46 extends from the bore.

The handle guard means 32 includes a guide portion 50 and a guard portion 52. The guide portion 50 extends downwardly from the housing 12 to a lower end and the guard portion extends forwardly from the lower end of the guide portion 50 to the housing, the handle 34 being pivotally supported adjacent the connection of the guard portion 52 to the housing 12. It is to be understood that the guide portion 50 and the guard portion 52 are an integral part of the casting forming the housing 12.

The handle guard means 32 includes a stop 54 adjacent the integral connection of the guide portion 50 and the guard portion 52 for limiting downward pivotal movement of the handle 34.

The guide portion 50 has a cross section, as best viewed in FIG. 3, including a base 56 and a forwardly extending rib 58 with the rib 58 having a front edge 60. In other words, the guide portion 50 has a T-shaped cross section. The recesses 44 are disposed in the front edge 60 of the rib 58.

The rear end 40 of the handle 34 is bifurcated to define a pair of spaced flanges 62 which are disposed on either side of the rib 58. The plunger 46 is disposed in the space or opening between the flanges 62 for engaging the recesses 44. The recesses 44 are arcuate and the end of the plunger 46 is spherical for engaging the recesses 44.

The handle 34 may be gripped and pivotted upwardly from the position shown in FIG. 1 until the plunger 46 engages one of the recesses 44. In such a position the handle 34 may be released and there is sufficient frictional contact between the plunger 46 and the surface of one of the recesses 44 to maintain the handle in that selected position. However, with the proper spring force of the spring 48 very little effort is required for the handle to move from the selected position as the plunger 46 moves into the bore to compress the spring 48 and ride along the front edge 60 of the rib 58. Thus, it will be appreciated that the subject invention provides a very simple, inexpensive yet reliable latch mechanism for an automatic liquid dispensing nozzle assembly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A nozzle latch assembly comprising; a housing having an inlet and an outlet with a fluid passage extending therebetween, valve means disposed in said passage for controlling fluid flow therethrough and including valve actuating means extending exteriorly of said housing, handle guard means extending from said housing adjacent said valve actuating means, a handle pivotally supported at a front end thereof and extending to a rear end adjacent said handle guard means and engaging said valve actuating means for moving said valve actuating means upon pivotal movement thereof, and detent means operatively interconnecting said rear end of said handle and said handle guard means for frictionally holding said handle in a selected position until said handle is subjected to a predetermined force, said detent means including at least one recess and a plunger for frictionally engaging said recess and biasing means for urging said plunger into said recess while allowing said plunger to retract from said recess in response to said predetermined force, said rear end of said handle including a bore extending thereinto, said biasing means and said plunger being disposed in said bore with said biasing means being disposed between the inward end of said plunger and the bottom of said bore and said plunger extending from said bore, said recess being disposed in said handle guard means, said handle guard means including a guide portion extending downwardly from said housing to a lower end and a guard portion extending forwardly from said end to said housing, said handle being pivotally supported adjacent the connection of said guard portion to said housing, said handle guard means including a stop adjacent the connection of said guide portion to said guard portion for limiting downward pivotal movement of said handle, said guide portion has a cross section including a base and a forwardly extending rib having a front edge, said recess being disposed in said front edge of said rib, said rear end of said handle being bifurcated to define a pair of spaced flanges disposed on either side of said rib and said plunger being disposed in the space between said flanges.

2. An assembly as set forth in claim 1 including a plurality of said recesses spaced along said front edge of said rib.

3. An assembly as set forth in claim 2 wherein said biasing means includes a coil spring.

* * * * *